Patented Oct. 28, 1930

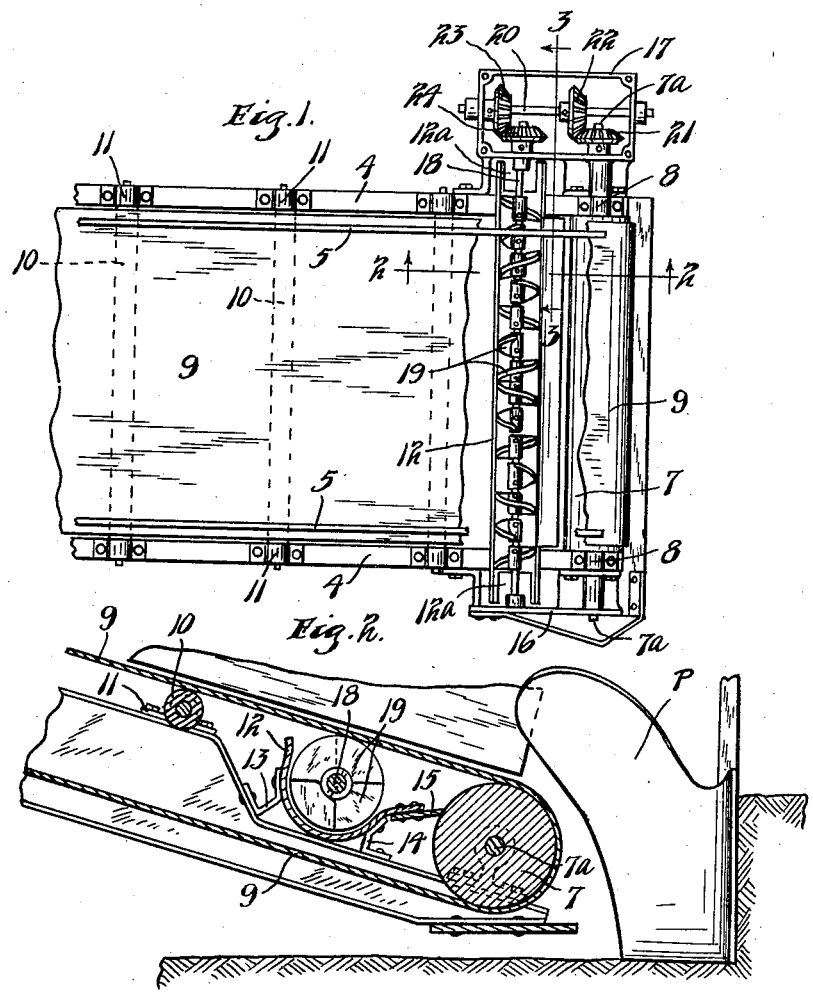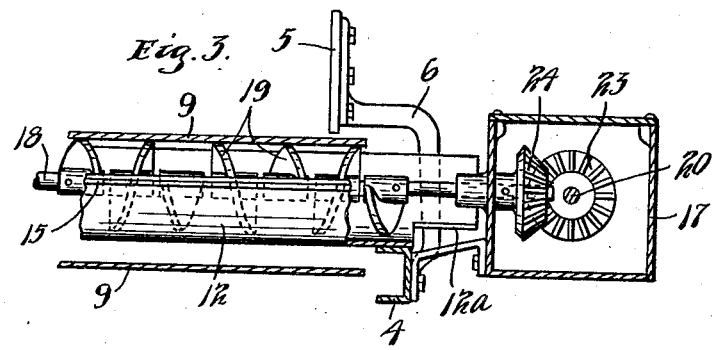

1,779,686

UNITED STATES PATENT OFFICE

ARNIE ALVER, OF MINNEAPOLIS, MINNESOTA

ATTACHMENT FOR ELEVATING GRADERS AND THE LIKE

Application filed October 29, 1927. Serial No. 229,624.

This invention relates to improvements on grading and ditching machinery and the like, of the type wherein the soil is piled up and thrown upon the endless conveyor belt of an inclined elevator, the plowed soil being carried to the delivery end of the elevator and discharged therefrom. Such machines are common in the art and are often referred to as elevating graders or ditchers.

In machines of this type small amounts of the plowed soil fall or are thrown between the upper and lower leaves of the endless conveyor belt often sticking to the belt roller particularly the belt roll at the lower receiving end of the elevator, and thereby seriously interfering with the free and perfect action of the elevator and sometimes causing serious damage to the elevator.

It is the main object of my invention to provide a simple by highly efficient device which may be embodied in the machinery when the same is constructed or which may be applied as an attachment to standard machinery on the market at this time, for positively removing the soil from the lower belt roll and from between the leaves of the belt conveyor. I am aware that some devices have been constructed for the purpose of removing the soil but heretofore to my knowledge, such devices have been cumbersome and inefficient and would usually clog or fail to remove the material when the machine was subjected to heavy duty.

A further object of my invention is to provide a device of the class above described which will effectively divide the soil and undesirable material thrown between the leaves of the conveyor belt and discharge said material from opposite sides of said belt.

Another object is to provide conveying means for removing said soil, which will chop up or disintegrate the material as well as discharge the same from the machine, thereby preventing the same from clogging or obstructing the discharging means.

A still further object is to provide a device of the class described having novel, disintegrating and conveying elements for removing the soil and adapted to moreover simultaneously scrape the under side of the upper leaf of the conveyor belt to remove adhering soil therefrom.

These and other objects and advantages of the invention will be apparent from the following description made in connection with the accompanying drawings, wherein like reference characters refer to similar parts throughout the several views and in which:

Fig. 1 is a fragmentary plan view showing the lower or receiving end of the elevator on an elevating grader having embodied therein a preferred form of my invention;

Fig. 2 is a cross section taken on the line 2—2 of Fig. 1 and showing the plow and its relation with the elevator; and Fig. 3 is a section taken on the line 3—3 of Fig. 1.

In the drawings, the inclined elevator frame of an elevating grader is indicated by the numeral 4, the lower end of said frame being disposed slightly above the ground. Elevator frame 4 is supported from the main frame of the grader in any suitable way and is usually mounted for angular adjustment relatively to the ground. As shown, frame 4 is constructed from channel members secured together and supporting the stationary conveyor sides 5 by means of straps or brackets 6. A lower conveyor roller 7 is mounted across the lower end of frame 4 having its shaft or trunnion 7ª journaled in suitable bearings 8 provided on frame 4. A conveyor belt 9 passes around roller 7 and also passes over a plurality of parallel spaced relatively small rollers 10 extending across frame 4 and journaled in suitable bearings 11 provided on the upper side of said frame.

It will be observed that the plow P is disposed at the receiving end of the elevator in position to throw its furrow directly upon the lower end of the carrier belt 9.

Between the leaves of the carrier belt 9 and the frame 4 I mount a conveyor trough 12, shown as secured to frame 4 by means of brackets 13 and 14 respectively. Trough 12 is disposed slightly to the rear of the lower carrier roller 7 and may have a forwardly extending blade 15 disposed in close relation to roller 7 and adapted to scrape off dirt and other material which has clogged thereon.

It will be noted that the ends of trough 12 project slightly beyond the sides of frame 4 and have recessed bottoms 12$^a$ through which material may drop to the ground. A shoe or frame 16 is disposed at one side of elevator frame 4 suitably supported from frame 4. A box-like gear casing 17 is rigidly supported on the opposite side of frame 4 having its longitudinal vertical walls horizontally parallel with the vertical portion of frame 16. A conveyor shaft 18 is journaled in suitable bearings carried by the vertical opposing walls of frame 16 and gear casing 17, said shaft extending substantially horizontally across frame 4 and disposed above trough 12. Two sets of spaced conveyor elements are rigidly secured to shaft 18, said sets starting at approximately the middle of shaft 18 and extending to points adjacent the ends of trough 12. The conveyor elements 19 are all identical and each constitutes a separate and independent screw segment, as illustrated, being of substantially 90° or one-fourth of a complete and spiral having a radius slightly less than the distance between the axis of conveyor shaft 18 and trough 12 and substantially equal to the distance between the axis of shaft 18 and the under surface of the upper leaf of the carrier belt 9. In both sets the conveyor elements are spaced apart and spirally arranged to convey material outwardly from the center of the conveyor belt to the respective sides thereof.

Any suitable means may be provided for driving conveyor shaft 18. As illustrated, shaft 18 is driven from the lower carrier belt roll, the driving shaft 20 being suitably journaled in the vertical ends of gear casing 17, being transversely disposed with reference to the conveyor shaft 18 and lower shaft 7$^a$. Lower shaft 7$^a$ is extended and terminates within gear casing 17 having a bevel gear 21 rigidly secured adjacent the extremity thereof. Bevel gear 21 meshes with the bevel gear 22 carried by driving shaft 20 and a second bevel gear 23 on shaft 20 drives conveyor shaft 18 through engagement with a bevel gear 24 rigidly secured to the adjacent extremity of shaft 18 disposed within gear casing 17.

The operation of my device, while perhaps obvious from the foregoing description, may be briefly summarized as follows:—

Material is scraped from the lower carrier roll 7 by means of blade 15 being pushed rearwardly into conveyor trough 12. Material is also scraped from the under side of the upper leaf of the carrier belt 9 by means of the engagement of the conveyor segments 19 therewith. Such material drops between the conveyor elements and together with material scraped from the roll is broken up or disintegrated by the independent spaced screw segments 19 and is moreover carried to one or the other sides of the conveyor belt, dropping downwardly through the apertured ends 12$^a$ of the conveyor trough. It is obvious that part of the material will be conveyed and discharged at one side of the belt, while the other portion of the material will be conveyed to the opposite side of the belt.

Even though the soil is wet and sticky the independent spaced conveyor sections 19 will disintegrate the same and prevent clogging of the conveyor and will nevertheless cause the material to be carried to the respective ends of trough 12 and discharged therefrom. Heretofore, devices for removing soil from between the leaves of a conveyor belt in grading and ditching machines have generally been unsuccessful when the machine was used for plowing wet soil or clay. With my device, it will be obvious that the material between the leaves of the belt may be scraped from the belt and from the roll and will be disintegrated and discharged from the sides of the belt. It will be impossible for the conveyor to become clogged.

In view of the foregoing description it will be seen that I have invented simple but highly efficient apparatus for obtaining the desired results, said apparatus being capable of application to standard machinery now in use, as well as being adapted for embodiment in the manufacture of road grading and ditching machinery.

It will, of course, be understood that various changes may be made in the form, details, arrangement and proportions of the parts without departing from the scope of the invention.

What is claimed is:

1. In an elevator grader having the usual inclined carrier frame, an endless carrier belt mounted on upper and lower carrier rollers, an attachment comprising a trough mounted transversely of said carrier frame between the leaves of the carrier belt, means associated with said trough for scraping material into said trough from the lower carrier roll, a rotary shaft extending longitudinally and above said trough and below the upper leaf of said carrier belt, and two sets of independent spaced screw segments fixed to said shaft, the segments in both sets being spirally arranged, one set being arranged to deliver to one edge of said carrier belt and the other set being arranged to deliver to the opposite edge of said carrier belt.

2. In an elevator grader having the usual inclined carrier frame, an endless carrier belt mounted on upper and lower carrier rollers, an attachment comprising a trough mounted transversely of said carrier frame between the leaves of the carrier belt, means associated with said trough for scraping material into said trough from the lower carrier roll, a rotary shaft extending longitudinally and above said trough and below the upper leaf of said carrier belt and a plurality of independent spaced screw segments fixed in spiral arrangement upon said shaft and adapted to disintegrate material in said trough and to convey said material transversely of said belt, delivering the same at one edge of said belt, said screw segments being adapted to engage the under side of the upper leaf of said carrier belt to scrape material therefrom.

3. In an elevator grader having the usual inclined carrier frame and an endless carrier belt mounted on upper and lower carrier rollers, an attachment comprising a trough mounted transversely of said frame between the leaves of the carrier belt and adjacent the lower carrier roller, said trough having a scraper at its forward edge for scraping material from said lower roller into the trough, a rotary shaft extending longitudinally of and above the bottom of said trough, a series of independent spaced screw segments extending in spiral arrangement upon one end of said shaft for disintegrating material in said trough and delivering a portion thereof at one edge of said carrier belt, a second set of spaced screw segments extending in spiral arrangement upon the opposite end of said shaft and adapted to disintegrate material and deliver a portion thereof to the opposite edge of said carrier belt, said screw segments being disposed in juxtaposition to the undersurface of the upper leaf of the carrier belt.

In testimony whereof I affix my signature.

ARNIE ALVER.